US012800024B2

(12) United States Patent
Yu et al.

(10) Patent No.: US 12,800,024 B2
(45) Date of Patent: Nov. 17, 2026

(54) AUTOMOBILE TRANSMISSION WITH FORCED LUBRICATION SYSTEM

(71) Applicant: ZHE JIANG SIEKON TRANSMISSION TECHNOLOGY CO., LTD, Jiaxing (CN)

(72) Inventors: Wenyong Yu, Jiaxing (CN); Yang Zhu, Jiaxing (CN); Chao Yang, Jiaxing (CN); Fengli Huang, Jiaxing (CN)

(73) Assignee: ZHE JIANG SIEKON TRANSMISSION TECHNOLOGY CO., LTD, Jiaxing (CN)

( * ) Notice: Subject to any disclaimer, the term of this patent is extended or adjusted under 35 U.S.C. 154(b) by 33 days.

(21) Appl. No.: 19/022,235

(22) Filed: Jan. 15, 2025

(65) Prior Publication Data

US 2025/0172206 A1 May 29, 2025

Related U.S. Application Data

(63) Continuation of application No. PCT/CN2024/111956, filed on Aug. 14, 2024.

(30) Foreign Application Priority Data

Nov. 29, 2023 (CN) ........................ 202323252930.X

(51) Int. Cl.
*F16H 57/04* (2010.01)
*F16H 57/021* (2012.01)

(52) U.S. Cl.
CPC ....... *F16H 57/0471* (2013.01); *F16H 57/021* (2013.01); *F16H 57/0404* (2013.01); (Continued)

(58) Field of Classification Search
CPC .. F16H 57/0445; F16H 57/04; F16H 57/0471; F16H 57/0423; F16H 57/0424; F16H 57/0436; F16N 7/38
See application file for complete search history.

(56) References Cited

U.S. PATENT DOCUMENTS 4,621,710 A * 11/1986 Tsukamoto ......... F16H 57/0456 184/6.12
6,206,140 B1 * 3/2001 Craft ................... F16H 57/0493 184/6.12

(Continued)

FOREIGN PATENT DOCUMENTS

CN 103307261 A * 9/2013
CN 204647250 U 9/2015

(Continued)

OTHER PUBLICATIONS

International Search Report issued in corresponding International application No. PCT/CN2024/111956, mailed Oct. 31, 2024 (7 pages).

(Continued)

*Primary Examiner* — Michael A Riegelman
(74) *Attorney, Agent, or Firm* — HOWARD M COHN and Associates, LLC

(57) ABSTRACT

Disclosed is an automobile transmission with a forced lubrication system, including a front housing, a rear housing, an input shaft, an intermediate shaft, and an output shaft. A lubrication mechanism is arranged on the front housing and includes an oil pump, an oil filter, and an oil pipe for connecting the oil pump and the oil filter. an oil pump seat is arranged below the bearing corresponding to the intermediate shaft on the front housing, the oil pump is located inside the oil pump seat, and the oil filter is located inside the oil sump at the bottom of the front housing; the oil pump seat is provided with an oil inlet hole and an oil outlet hole, the oil inlet hole is connected to the oil pipe, and the oil outlet hole faces the bearing corresponding to the intermediate shaft.

6 Claims, 5 Drawing Sheets

(52) U.S. Cl.
CPC ..... *F16H 57/0423* (2013.01); *F16H 57/0424* (2013.01); *F16H 57/0436* (2013.01)

(56) References Cited

U.S. PATENT DOCUMENTS

| | | | | | |
|---|---|---|---|---|---|
| 6,582,331 | B1 * | 6/2003 | Baxter, Jr. | F16H 57/05 474/91 |
| 11,320,039 | B2 * | 5/2022 | Isozaki | F16H 57/0423 |
| 11,781,643 | B2 * | 10/2023 | Fujimoto | F16H 57/045 184/6.12 |
| 11,873,897 | B2 * | 1/2024 | Nakamatsu | F16H 57/0424 |
| 12,162,347 | B2 * | 12/2024 | Markow | B60K 17/043 |
| 2020/0256455 | A1 * | 8/2020 | Lamm | F16H 57/0483 |
| 2025/0172206 | A1 * | 5/2025 | Yu | F16H 57/0441 |
| 2025/0334175 | A1 * | 10/2025 | Blitz | F16H 57/0404 |

FOREIGN PATENT DOCUMENTS

| | | | | | |
|---|---|---|---|---|---|
| CN | 212251039 | U | * | 12/2020 | |
| CN | 113864182 | A | * | 12/2021 | F01M 1/02 |
| CN | 216895671 | U | | 7/2022 | |
| CN | 218718703 | U | | 3/2023 | |
| CN | 221482604 | U | | 8/2024 | |
| EP | 1016808 | A2 | * | 7/2000 | F16H 57/0456 |
| JP | 2018189180 | A | | 11/2018 | |
| JP | 2020118263 | A | * | 8/2020 | F16H 57/0442 |
| KR | 19990033730 | A | | 5/1999 | |

OTHER PUBLICATIONS

Written Opinion of the International Search Authority in corresponding International application No. PCT/CN2024/111956, mailed Oct. 31, 2024 (7 pages).

* cited by examiner

AUTOMOBILE TRANSMISSION WITH FORCED LUBRICATION SYSTEM

TECHNICAL FIELD

The present disclosure belongs to the technical field of transmissions, and more specifically relates to an automobile transmission with a forced lubrication system.

BACKGROUND

In a new energy pure electric vehicle, a transmission is generally arranged between a motor and a wheel shaft, and a gear transmission system is arranged inside the transmission. In order to ensure the normal operation of an internal gear, lubricating oil is generally injected into the bottom of a transmission housing to form an oil sump, a part of the lower part of the internal gear is immersed in the lubricating oil, and the lubricating oil is enabled to splash inside the transmission with the rotation of the gear, thereby lubricating various components and parts inside the transmission. However, such a conventional passive lubrication method often fails to throw the lubricating oil to high transmission components (such as gears, bearings, and gear shift mechanisms), resulting in ineffective lubrication of the high transmission components, which affects the overall operation and service life of the transmission.

A Chinese patent with the publication number CN112610682A discloses an active lubrication and cooling system for a new energy vehicle transmission, where an oil pump is connected to an intermediate transmission shaft inside the transmission, and lubricating oil at the bottom of the transmission is pumped to a heat exchanger by means of the oil pump for heat dissipation; and then, an oil guide pipe connected to the heat exchanger is enabled to extend into the transmission again, a plurality of oil holes are reserved in the oil guide pipe, and the lubricating oil is sprayed onto fixed-point locations inside the transmission through the oil holes, so that effective lubrication is achieved.

However, due to the narrow and complex internal space of the transmission, the oil guide pipe can only be designed to be relatively thin, which limits the total amount of the lubricating oil delivered by the oil guide pipe. In order to achieve lubrication of fixed-point locations, the plurality of oil holes are reserved in the oil guide pipe, which reduces the amount of the lubricating oil that can be sprayed from each oil hole, resulting in a more limited actual amount of the lubricating oil that can lubricate bearings, and an unsatisfactory lubrication effect on the bearings.

SUMMARY

In view of the shortcomings in the prior art, the present disclosure provides an automobile transmission with a forced lubrication system, which has a sufficient oil injection amount and thus achieves a desired lubrication effect on bearings.

To achieve the above objective, the present disclosure provides the following technical solutions: an automobile transmission with a forced lubrication system includes a front housing, a rear housing, an input shaft, an intermediate shaft, and an output shaft, the input shaft and the intermediate shaft being located above the output shaft, an oil sump being formed below the output shaft, and the front housing being provided with bearings corresponding to the input shaft and the intermediate shaft, where the intermediate shaft is a hollow shaft, a lubrication mechanism is arranged on the front housing and includes an oil pump, an oil filter, and an oil pipe for connecting the oil pump and the oil filter, an oil pump seat is arranged below the bearing corresponding to the intermediate shaft on the front housing, the oil pump is located inside the oil pump seat, and the oil filter is located inside the oil sump at the bottom of the front housing;

the oil pump seat is provided with an oil inlet hole and an oil outlet hole, the oil inlet hole is connected to the oil pipe, and the oil outlet hole faces the bearing corresponding to the intermediate shaft; and an oil passage is provided inside the front housing, one end of the oil passage is connected to the oil outlet hole, and the other end of the oil passage faces the bearing corresponding to the input shaft.

Further, the oil pump includes an inner rotor, an outer rotor, an oil pump shaft, and an oil pump cover, the inner rotor is connected to the oil pump shaft, the outer rotor is rotatably connected to the interior of the oil pump seat, the oil pump cover is connected to the front housing, the oil inlet hole and the oil outlet hole are respectively located on both sides of the inner rotor, the oil pump cover is provided with a first lubrication hole, and the first lubrication hole faces the bearing corresponding to the intermediate shaft and in communication with the oil outlet hole.

Further, a steel sleeve for mounting the bearing corresponding to the input shaft is arranged on the front housing, a second lubrication hole connected to the oil passage is reserved in the steel sleeve, an oil groove corresponding to the second lubrication hole is formed in an inner side surface of the steel sleeve, and the oil groove extends axially along the inner side surface of the steel sleeve to both sides of the bearing.

Further, a depth of the oil groove is greater than a width of the bearing corresponding to the input shaft.

Further, the inner rotor is connected to one end of the oil pump shaft, the other end of the oil pump shaft extends into a bushing through a center hole reserved in the oil pump cover, and the bushing is connected to the hollow intermediate shaft.

Further, the oil pump shaft is a hollow shaft, the oil pump seat is provided with a third lubrication hole corresponding to the oil pump shaft, one end of the third lubrication hole is in communication with the intermediate shaft by means of the hollow oil pump shaft, and the other end of the third lubrication hole is in communication with the oil passage.

Further, the oil pump seat is internally provided with an inlet oil storage tank corresponding to the oil inlet hole, and an outlet oil storage tank corresponding to the oil outlet hole.

Further, the front housing is provided with an oil delivery channel for connecting the oil inlet hole and the oil pipe.

Compared with the prior art, the present disclosure has the beneficial effects that after being sucked by the oil pump, the lubricating oil is directly sprayed onto the bearings through the oil pump, or the oil passage and lubrication holes inside the front housing for lubricating, and the oil injection amount is sufficient, so that a desired lubrication effect on bearings is achieved.

Figure 1:
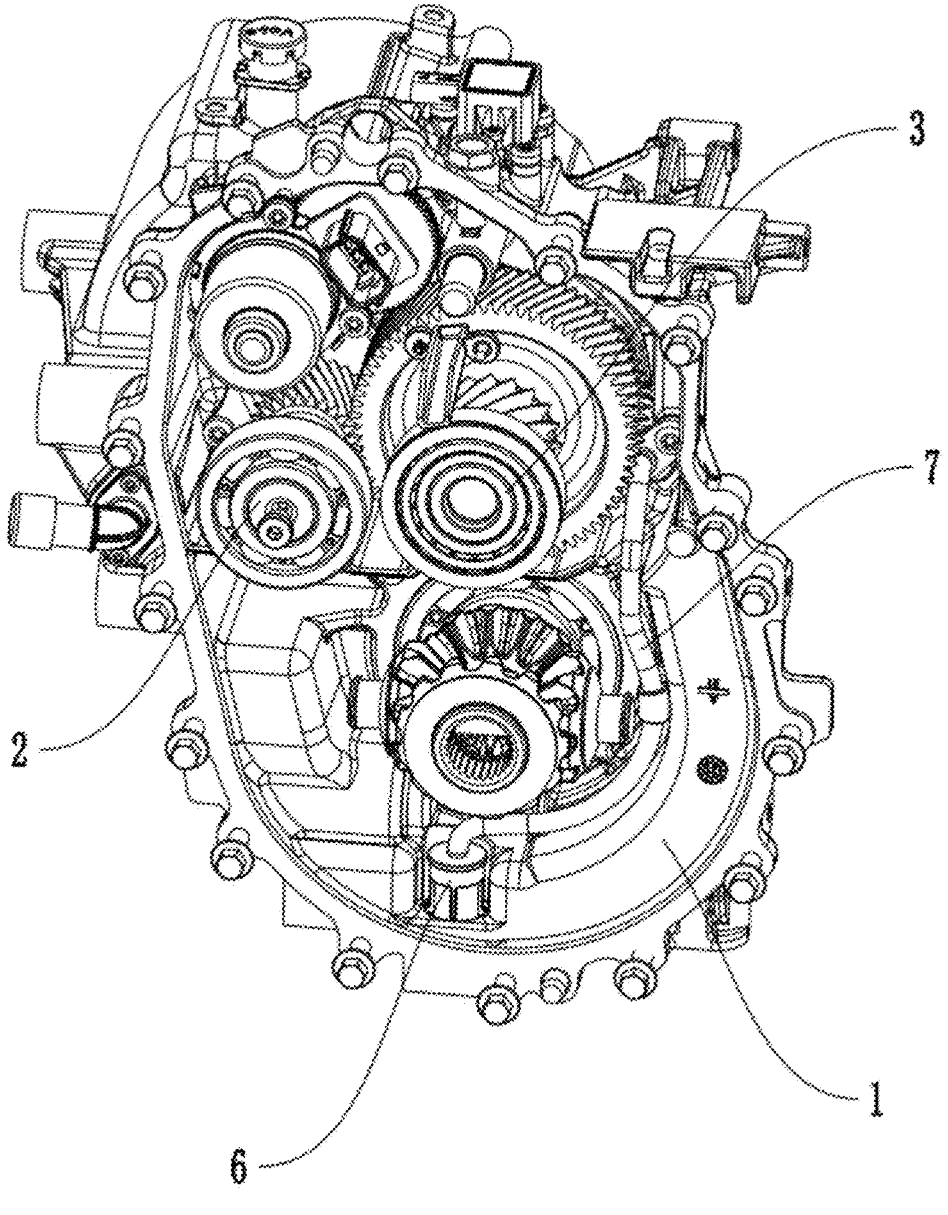
FIG. 1 is a schematic diagram of an internal structure of an automobile transmission with a forced lubrication system according to the present disclosure.

Description of reference numerals: 1 denotes a front housing; 2 denotes an input shaft; 3 denotes an intermediate shaft; 4 denotes bearings; 5 denotes an oil pump; 6 denotes an oil filter; 7 denotes an oil pipe; 8 denotes an oil pump seat; 9 denotes an oil inlet hole; 10 denotes an oil outlet hole; 11 denotes an oil passage; 12 denotes an inner rotor; 13 denotes an outer rotor; 14 denotes an oil pump cover; 15 denotes a first lubrication hole; 16 denotes a steel sleeve; 17 denotes a second lubrication hole; 18 denotes an oil groove; 19 denotes an oil pump shaft; 20 denotes a bushing; 21 denotes a third lubrication hole; 22 denotes an inlet oil storage tank; 23 denotes an outlet oil storage tank; and 24 denotes an oil delivery channel.

DETAILED DESCRIPTION

In the description of the present invention, it should be noted that for nouns of locality, the orientation and position relationships indicated by the terms such as "center," "horizontal (X)," "longitudinal (Y)," "vertical (Z)," "length," "width," "thickness," "up," "down," "front," "back," "left," "right," "upright," 'lateral," "top," "bottom," "inside," "outside," "clockwise," and "counterclockwise" are based on the orientation or position relationships shown in the accompanying drawings, are only for convenience of describing the present invention and simplifying the description, and do not indicate or imply that the indicated device or element must have a specific orientation, or be constructed and operated in a specific orientation, and therefore cannot be understood as a limitation on the specific protection scope of the present invention.

In addition, the descriptions of terms "first," "second", and the like are only used for descriptive purposes, and cannot be understood as indicating or implying their relative importance or implying the number of indicated technical features. Therefore, the features defined with "first" and "second" may explicitly or implicitly include one or more of these features. In the description of the present invention, the meanings of "several" and "a plurality of" are two or more, unless otherwise clearly and specifically defined.

The present invention will be further described with reference to FIG. 1 to FIG. 5.

An automobile transmission with a forced lubrication system includes a front housing 1, a rear housing, an input shaft 2, an intermediate shaft 3, and an output shaft. The input shaft 2 and the intermediate shaft 3 are located above the output shaft. An oil sump is formed below the output shaft. The front housing 1 is provided with bearings corresponding to the input shaft 2 and the intermediate shaft 3. The intermediate shaft 3 is a hollow shaft. A lubrication mechanism is arranged on the front housing 1 and includes an oil pump 5, an oil filter 6, and an oil pipe 7 for connecting the oil pump 5 and the oil filter 6. An oil pump seat 8 is arranged below the bearing corresponding to the intermediate shaft 3 on the front housing 1. The oil pump 5 is located inside the oil pump seat 8. The oil filter 6 is located inside the oil sump at the bottom of the front housing 1.

The oil pump seat 8 is provided with an oil inlet hole 9 and an oil outlet hole 10. The oil inlet hole 9 is connected to the oil pipe 7. The oil outlet hole 10 faces the bearing corresponding to the intermediate shaft 3. An oil passage 11 (dashed line part) is provided inside the front housing 1. One end of the oil passage 11 is connected to the oil outlet hole 10 and the other end of the oil passage faces the bearing corresponding to the input shaft 2.

Figure 2:
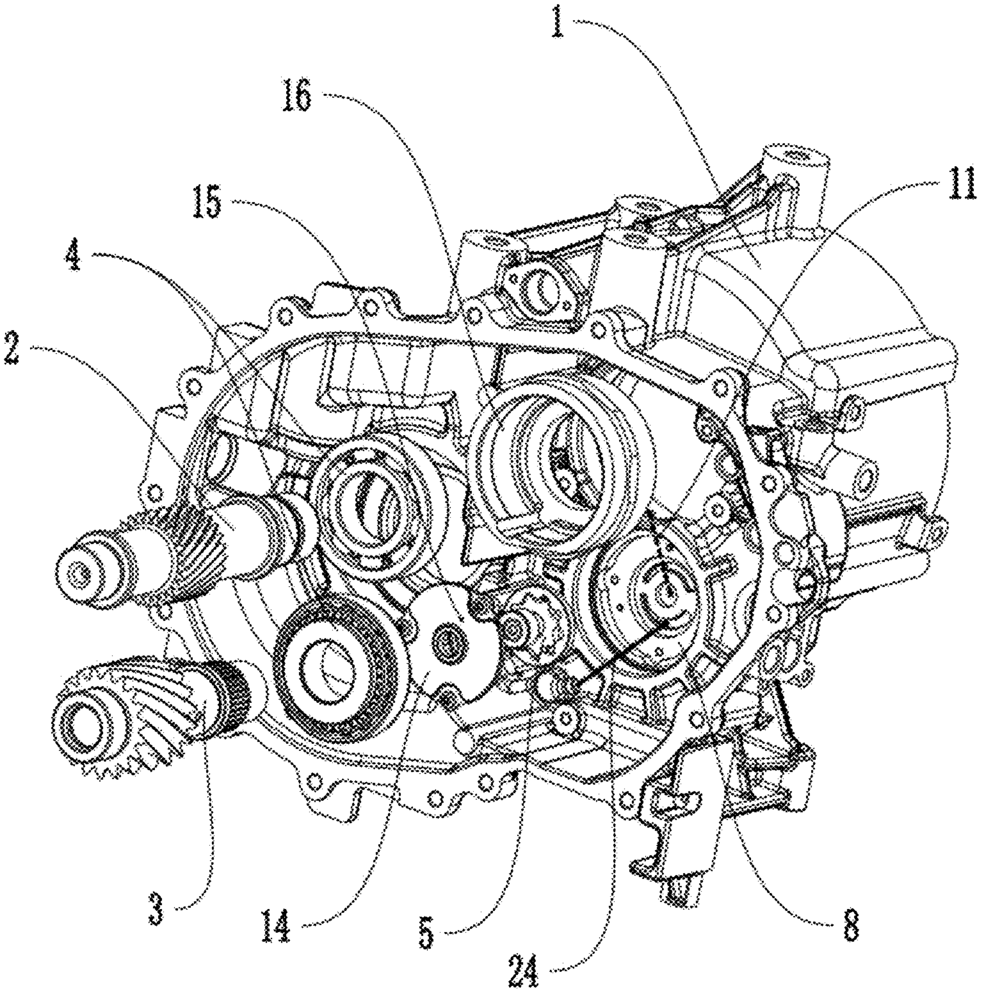
FIG. 2 is a schematic exploded diagram of a lubrication structure in the automobile transmission with a forced lubrication system according to the present disclosure.

As shown in FIG. 2, preferably, in this embodiment, the oil pump 5 includes an inner rotor 12, an outer rotor 13, an oil pump shaft 19, and an oil pump cover 14. The inner rotor 12 is connected to the oil pump shaft 19. The outer rotor 13 is rotatably connected to the interior of the oil pump seat 8. The oil pump cover 14 is connected to the front housing 1. The oil inlet hole 9 and the oil outlet hole 10 are respectively located on both sides of the inner rotor 12. The oil pump cover 14 is provided with a first lubrication hole 15. The first lubrication hole 15 faces the bearing corresponding to the intermediate shaft 3 and is in communication with the oil outlet hole 10.

Figure 5:
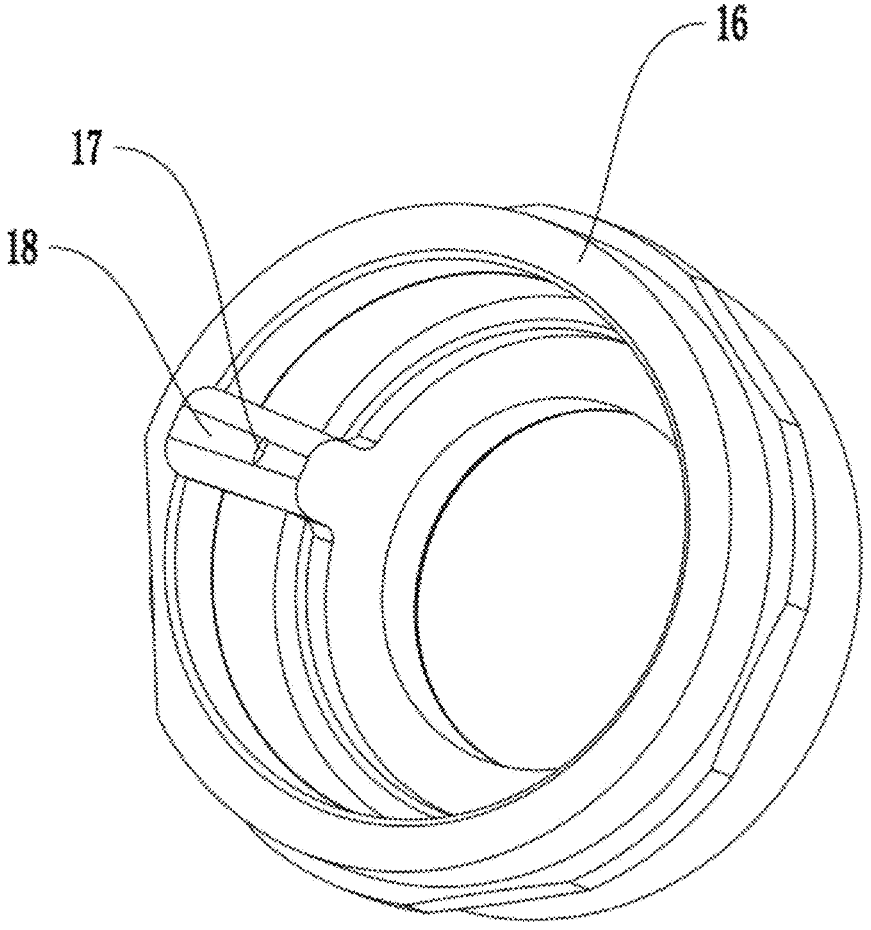
FIG. 5 is a schematic structural diagram of a steel sleeve in the automobile transmission with a forced lubrication system according to the present disclosure.

As shown in FIG. 2 and FIG. 5, preferably, in this embodiment, a steel sleeve 16 for mounting the bearing corresponding to the input shaft 2 is arranged on the front housing 1. A second lubrication hole 17 connected to the oil passage 11 is reserved in the steel sleeve 16. An oil groove 18 corresponding to the second lubrication hole 17 is formed in the inner side surface of the steel sleeve 16, and the oil groove 18 extends axially along the inner side surface of the steel sleeve 16 to both sides of the bearing.

As shown in FIG. 5, preferably, in this embodiment, a depth of the oil groove 18 is greater than a width of the bearing corresponding to the input shaft 2.

Figure 4:
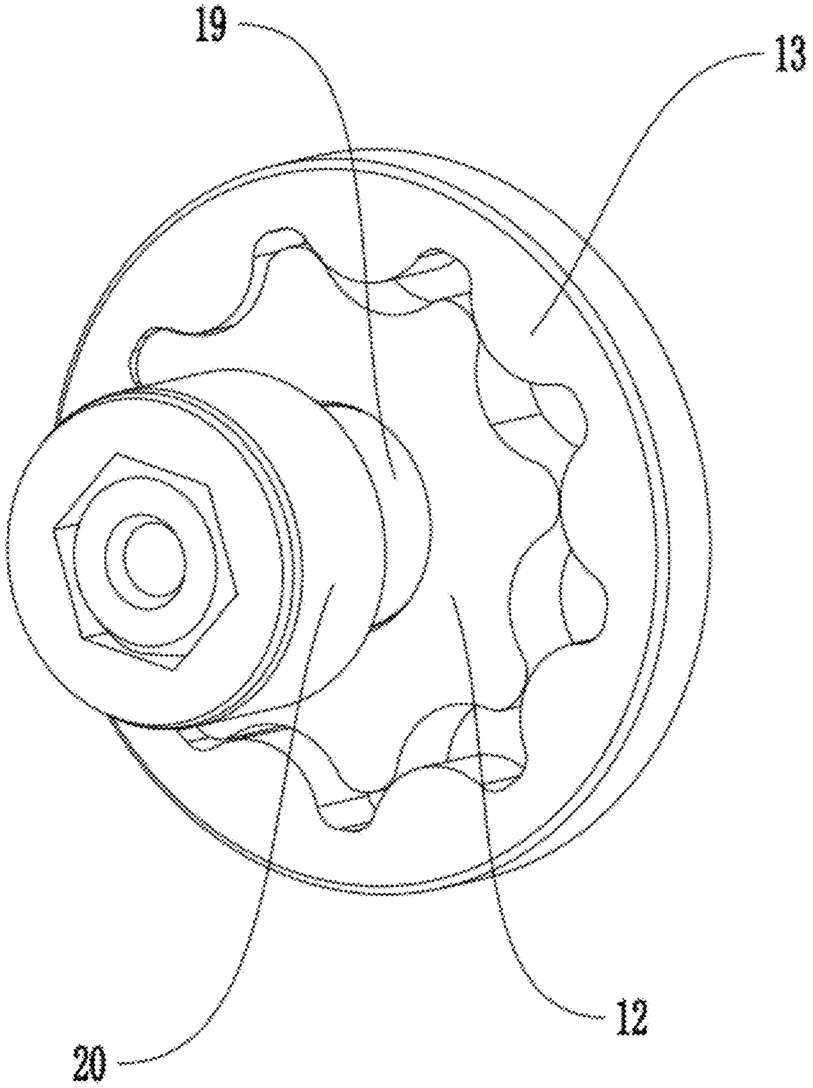
FIG. 4 is a schematic structural diagram of an oil pump in the automobile transmission with a forced lubrication system according to the present disclosure.

As shown in FIG. 2 and FIG. 4, preferably, in this embodiment, the inner rotor 12 is connected to one end of the oil pump shaft 19. The other end of the oil pump shaft 19 extends into a bushing 20 through a center hole reserved in the oil pump cover 14. The bushing 20 is connected to the hollow intermediate shaft 3.

As shown in FIG. 2 and FIG. 4, preferably, in this embodiment, the oil pump shaft 19 is a hollow shaft. The oil pump seat 8 is provided with a third lubrication hole 21 corresponding to the oil pump shaft 19. One end of the third lubrication hole 21 is in communication with the intermediate shaft 3 by means of the hollow oil pump shaft 19, and the other end of the third lubrication hole 21 is in communication with the oil passage 11.

When the lubricating oil enters the oil passage 11 through the oil outlet hole 10, part of the lubricating oil flows to the second lubrication hole 17 reserved in the steel sleeve 16, and the other part of the lubricating oil flows into the hollow intermediate shaft 3 through the third lubrication hole 21. Since both ends of the intermediate shaft 3 are horizontal, the lubricating oil inside the intermediate shaft will flow to the bearing at one end of the intermediate shaft 3 away from the oil pump 5, so as to achieve a certain lubrication of a bearing at the other end of the intermediate shaft 3.

Figure 3:
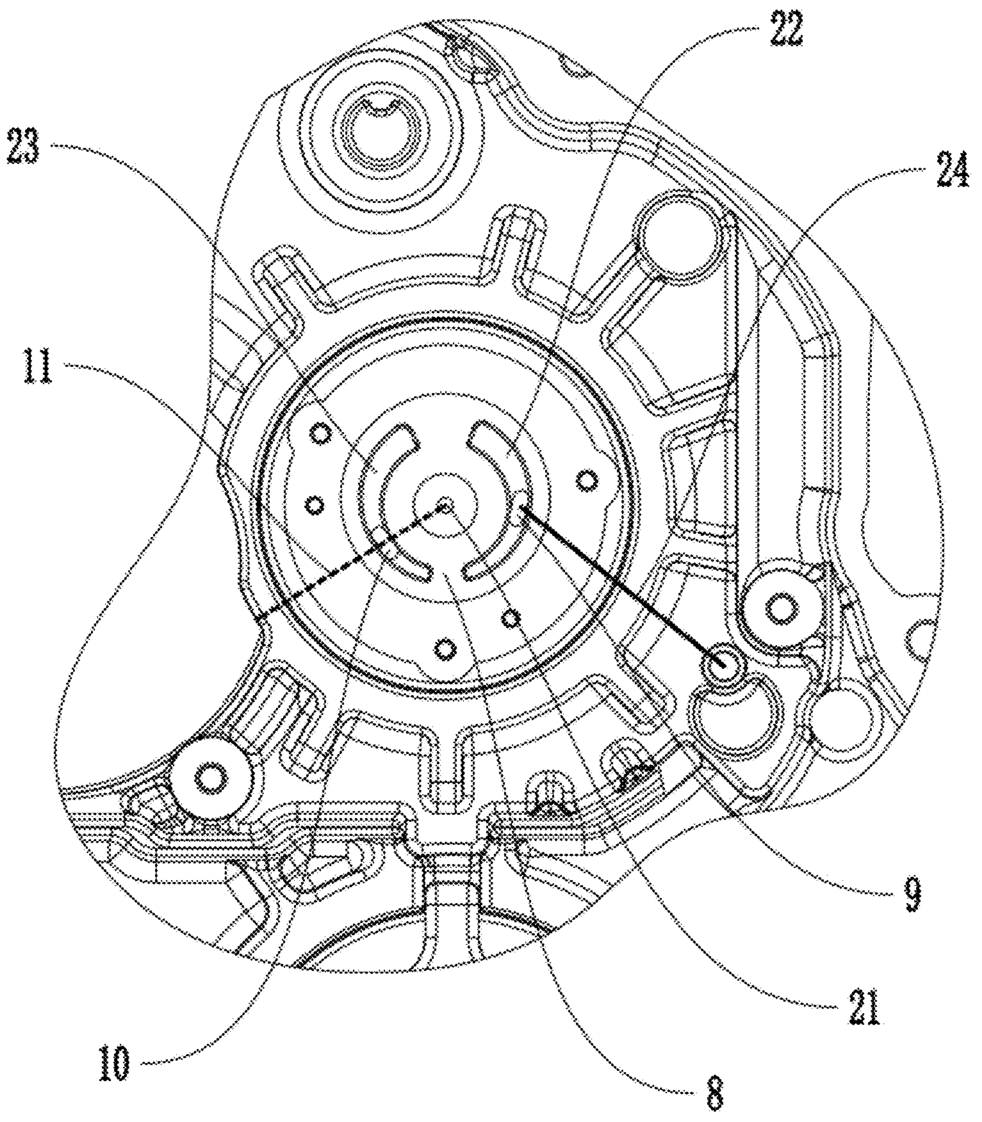
FIG. 3 is a schematic structural diagram of a front housing in the automobile transmission with a forced lubrication system according to the present disclosure.

As shown in FIG. 3, preferably, in this embodiment, the oil pump seat 8 is internally provided with an inlet oil storage tank 22 corresponding to the oil inlet hole 9, and an outlet oil storage tank 23 corresponding to the oil outlet hole 10.

As shown in FIG. 2 and FIG. 3, preferably, in this embodiment, the front housing 1 is provided with an oil delivery channel 24 (solid line part) for connecting the oil inlet hole 9 and the oil pipe 7.

As shown in FIG. 1 to FIG. 4, a motor drives the input shaft 2 of the transmission to rotate, and transmits the power to the output shaft by means of the intermediate shaft 3. When the intermediate shaft 3 rotates, the inner rotor is driven to rotate by the bushing 20 and the oil pump shaft 19, which therefore drives the outer rotor to rotate, so that the lubricating oil in the oil sump enters the oil pipe 7 through the filtration of the oil filter 6, then enters the oil delivery channel 24 through the oil pipe 7, and finally enters the oil pump 5 from the oil inlet hole 9. At this time, part of the lubricating oil is sprayed to the bearing corresponding to the intermediate shaft 3 through the first lubrication hole 15 reserved in the oil pump cover 14, and the other part of the lubricating oil enters the oil passage 11 through the oil outlet hole 10 reserved in the oil pump seat 8 and enters the second lubrication hole 17 reserved in the steel sleeve 16 of the input shaft 2 through the oil passage 11. The lubricating oil is sprayed to the bearing through the second lubrication hole 17, so as to achieve bearing lubrication. After being sucked by the oil pump 5, the lubricating oil is directly sprayed onto the bearings through the oil pump 5 or the lubrication holes in the front housing 1 for lubricating, and the oil injection amount is sufficient, so that a desired lubrication effect on bearings is achieved.

The above are only preferred embodiments of the present disclosure, and the scope of protection of the present disclosure is not limited to the above embodiments. Any technical solution belonging to the concept of the present disclosure is within the scope of protection of the present disclosure. It should be pointed out that a person of ordinary skill in the art may further make a plurality of improvements and modifications without departing from the principle of the present invention, and these improvements and modifications shall fall within the protection scope of the present invention.

What is claimed is:

1. An automobile transmission with a forced lubrication system, comprising:

a front housing;

an input shaft; and an intermediate shaft;

wherein bearings corresponding to the input shaft and the intermediate shaft are arranged on the front housing, the intermediate shaft is a hollow shaft, a lubrication mechanism is further arranged on the front housing and comprises an oil pump, an oil filter, and an oil pipe for connecting the oil pump and the oil filter;

wherein an oil pump seat is arranged below the bearing corresponding to the intermediate shaft on the front housing, and the oil pump is located inside the oil pump seat;

wherein the oil pump seat is provided with an oil inlet hole and an oil outlet hole, the oil inlet hole is connected to the oil pipe, and the oil outlet hole faces the bearing corresponding to the intermediate shaft; and an oil passage is provided inside the front housing, one end of the oil passage is connected to the oil outlet hole, and the other end of the oil passage faces the bearing corresponding to the input shaft;

wherein the oil pump comprises an inner rotor, an outer rotor, an oil pump shaft, and an oil pump cover, the inner rotor is connected to the oil pump shaft, the outer rotor is rotatably connected to an interior of the oil pump seat, the oil pump cover is connected to the front housing, the oil inlet hole and the oil outlet hole are respectively located on both sides of the inner rotor, the oil pump cover is provided with a first lubrication hole, and the first lubrication hole faces the bearing corresponding to the intermediate shaft and is in communication with the oil outlet hole.

2. The automobile transmission with a forced lubrication system according to claim 1, wherein a steel sleeve for mounting the bearing corresponding to the input shaft is arranged on the front housing, a second lubrication hole connected to the oil passage is reserved in the steel sleeve, an oil groove in communication with the second lubrication hole is formed in the steel sleeve, and the oil groove extends axially along the steel sleeve.

3. The automobile transmission with a forced lubrication system according to claim 2, wherein the inner rotor is connected to one end of the oil pump shaft, the other end of the oil pump shaft extends into a bushing, and the bushing is connected to the hollow intermediate shaft.

4. The automobile transmission with a forced lubrication system according to claim 3, wherein the oil pump shaft is a hollow shaft, the oil pump seat is provided with a third lubrication hole corresponding to the oil pump shaft, one end of the third lubrication hole is in communication with the intermediate shaft by means of the hollow oil pump shaft, and the other end of the third lubrication hole is in communication with the oil passage.

5. The automobile transmission with a forced lubrication system according to claim 4, wherein the oil pump seat is internally provided with an inlet oil storage tank corresponding to the oil inlet hole, and an outlet oil storage tank corresponding to the oil outlet hole.

6. The automobile transmission with a forced lubrication system according to claim 5, wherein the front housing is provided with an oil delivery channel for connecting the oil inlet hole and the oil pipe.

* * * * *